United States Patent [19]

Tanigami et al.

[11] Patent Number: 5,470,506
[45] Date of Patent: Nov. 28, 1995

[54] HEAT-GENERATING COMPOSITION

[75] Inventors: Yoshinori Tanigami, Nishinomiya; Takahiro Tabata, Takatsuki; Hidekazu Hashima, Ashiya; Akio Konishi, Kakogawa, all of Japan

[73] Assignee: Yamamura Glass Co., Ltd., Nishinomiya, Japan

[21] Appl. No.: 216,615

[22] Filed: Mar. 23, 1994

Related U.S. Application Data

[63] Continuation-in-part of Ser. No. 457,402, Dec. 27, 1989, abandoned, and Ser. No. 38,136, Mar. 26, 1993, abandoned, which is a continuation-in-part of Ser. No. 740,325, Aug. 5, 1991, abandoned.

[30] Foreign Application Priority Data

| Dec. 31, 1988 | [JP] | Japan | 63-33550 |
|---|---|---|---|
| Dec. 5, 1989 | [JP] | Japan | 1-317205 |
| Aug. 5, 1990 | [JP] | Japan | 2-207188 |

[51] Int. Cl.⁶ .......... H01B 1/14; C04B 14/00; C03C 3/064; C03C 3/068
[52] U.S. Cl. .......... 252/518; 252/521; 501/10; 501/32; 501/77; 501/78; 501/79
[58] Field of Search .......... 501/17, 19, 21, 501/32, 77, 78, 79, 2, 10; 252/518, 521

[56] References Cited

U.S. PATENT DOCUMENTS

| 3,681,737 | 8/1972 | Magnusson et al. | 338/262 |
|---|---|---|---|
| 4,039,997 | 8/1977 | Huang et al. | 338/308 |
| 4,119,573 | 10/1978 | Ishida et al. | 252/519 |
| 4,172,919 | 10/1979 | Mitchell | 428/209 |
| 4,323,484 | 4/1982 | Hattori et al. | 252/521 |
| 4,567,151 | 1/1986 | Taylor | 501/15 |
| 4,597,897 | 7/1986 | Donohue | 252/518 |
| 4,882,212 | 11/1989 | Singhdeo et al. | 428/76 |
| 4,985,377 | 1/1991 | Iseki et al. | 501/51 |
| 5,028,567 | 7/1991 | Gotoh et al. | 501/10 |
| 5,202,292 | 4/1993 | Tanabe et al. | 501/32 |

FOREIGN PATENT DOCUMENTS

| 53-50496 | 5/1978 | Japan . |
|---|---|---|
| 53-59897 | 5/1978 | Japan . |
| 53-59890 | 5/1978 | Japan . |
| 53-59891 | 5/1978 | Japan . |
| 53-59892 | 5/1978 | Japan . |
| 53-59894 | 5/1978 | Japan . |
| 53-59895 | 5/1978 | Japan . |

*Primary Examiner*—Mark L. Bell
*Assistant Examiner*—David Sample
*Attorney, Agent, or Firm*—Vineet Kohli; Thomas R. Morrison

[57] ABSTRACT

A novel heat-generating composition comprises an electrically conductive powder, and a crystallizable glass frit which is alkaline-earth borate glass essentially containing at least one component of rare-earth metal oxides and $Bi_2O_3$. A novel heat-generating composition comprises a molybdenum silicide as an electrically conductive powder, a glass frit, and an additive which is metal oxide powder and/or metal powder. A novel heat-generating composition comprises a combination of a molybdenum silicide and a nickel silicide as electrically conductive powder, a glass frit, and a nickel powder as an additive. The heat-generating composition is sintered in a nitrogen atmosphere or in air, to produce a heater, which has a low electrical-resistance value and a good heat-resistance.

14 Claims, 5 Drawing Sheets

HEAT-GENERATING COMPOSITION

This application is a continuation in part of application Ser. No. 07/457,402 filed Dec. 27, 1989, now abandoned and application Ser. No. 08/038,136 filed Mar. 26, 1993, now abandoned, which is a continuation in part of application Ser. No. 07/740,325 filed Aug. 5, 1991, now abandoned.

BACKGROUND OF THE INVENTION

As used herein, a heat-generating composition has the meaning of a powder or paste composition as an intermediate product. A heater has the meaning of a formed and sintered product made from the intermediate product.

This invention relates generally to a heat-generating composition, a heater, and more particuraly to a ceramic heater comprised of the heat-generating composition which is suitable for use in the home or in industry, because of having excellent heat-resistance and low electrical-resistance properties.

Japanese Laid-Open Patent Publication No. 53-50496 and No. 53-59897 disclose resistor compositions which comprise mixtures selected from electrically conductive substances such as, for example, molybdenum silicide, tungsten silicide, tantalum silicide, magnesium silicide, manganese silicide, with a glass frit. The resistor composition is prepared by mixing the components in a specified mixing ratio.

According to the foregoing prior art, the softening point of the glass frit is from 600° to 700° C. When glass frit is used as a binder for printing a surface heater pattern on a substrate, normal processing requires sintering at a temperature of from 900° to 1,000° C. Such temperatures are so far above the softening point of the glass frit that a printed pattern of the heat-generating composition may collapse. In this case, the resulting heater may be short-circuited. Further, if such glass frit is used to form a rod-shaped heater, the heat generated during use at a high temperature may deform the rod.

U.S. Pat. No. 4,597,897 discloses a hexaboride resistor composition which comprises conductive hexaboride particles and a non-reducible glass. The glass may be either crystalline or noncrystalline, and contains 20–35 mol % $B_2O_3$ and 10–30 mol % $M''O$ (wherein $M''$ is Ca, Sr, or Ba). However, the glass also contains 35–55 mol % $SiO_2$. Therefore, this prior art only discloses a resistor, and the properties thereof are completely different from those of a heater.

Japanese Laid-Open Patent Publication No. 57-128003 discloses a metallized composition used for forming a heat-generating pattern. The composition contains a selected weight ratio of tungsten to molybdenum. This material has a high temperature coefficient of resistance.

Japanese Laid-Open Patent Publication No. 53-50498 discloses a process for producing a resistor composition of molybdenum silicide, in which the temperature coefficient of resistance is relatively low. However, the sheet resistively of the resistor or heater formed from the composition by sintering is high.

U.S. Pat. No. 4,985,377 discloses a glaze resistor in which both metal silicide and metal boride are used as electrically conductive substances. U.S. Pat. Nos. 4,119,573 and 4,323,484 also disclose glaze resistors in which metal silicides are used as electrically conductive substances. However, the purpose and usage of these resistors are different from that of a heater as a conductor. Accordingly, the ratio of the electrically conductive substances to the glass frit is naturally different between resistors and heaters, and also the electrical-resistance values of both differ greatly. Furthermore, the kind of additives and their effects are also different between resistors and heaters. In these resistors, additives increase the electrical-resistance and the stability of electrical-resistance. Further, above-mentioned U.S. Pat. Nos. 4,119,573 and 4,323,484 disclose glaze resistor compositions contained silicides, which can be sintered at a low temperature such as 850° C. in air. However, resulting resistors have high electrical-resistances.

U.S. Pat. No. 4,882,212 discloses a ceramic-glass-metal composite material for a semiconductor casing. This composite material is an insulator which is completely different from a heater in characteristics and usage.

According to the conventional method of making a patterned ceramic heater, an electrically conductive powder and a glass frit are mixed, and a vehicle is added to produce a paste. The paste is printed in the desired pattern by a screen printing process. Then it is dried and sintered to make a ceramic heater. The ceramic heater prefers to have both a low electrical-resistance value and a low temperature coefficient of resistance (TCR) to perform effectively.

When the electrical-resistance value is low, the heater can be thinner, and also an arbitrary pattern for the uniform heat generation of the ceramic heater can be formed.

When the temperature coefficient of resistance (TCR) is low, it discreases a difference between an initial current value, immediately after switching on the heater, and a regular current value at a high temperature, during use of the heater. Thus, since the difference between the current value supplied to the heater immediately after energizing and the regular current value is smaller, it is suitable for use in the home. On the contrary, when the TCR value is large, the use of larger peripheral appliances is necessary. Additionally, when the TCR value is low, the heater generates heat uniformly.

Japanese Laid-Open Patent Publication No. 4-96201 discloses a heat-generating composition comprised a glass frit, an electrically conductive substance, and an additive. It is necessary that this composition is sintered at a high temperature such as 1,050° C. in a nitrogen atmosphere. In the mean time, Japanese Laid-Open Patent Publication No. 4-96201 corresponds to Japanese Patent Application No. 2-207188 from which Paris Convention Priority is claimed for this invention.

OBJECTS AND SUMMARY OF THE INVENTION

It is therefore a general object of this invention to provide a heat-generating composition and a heater sintered from the heat-generating composition, which overcome the disadvantages of the prior art.

It is a further object of this invention to provide a heat-generating composition which resists destruction or deformation due to sintering, and to provide a heat-generating composition for a heater which resists destruction or deformation due to heat during use.

It is a further object of this invention to provide a heat-generating composition for a heater which has a low electrical-resistance.

It is a further object of this invention to provide a heat-generating composition for a thinner heater with an arbitrary pattern which can generate uniform heat.

It is a further object of this invention to provide a heat-generating composition for a heater which has improved heat-resistance through repetitive increases and decreases in temperature.

It is a further object of this invention to provide a heat-generating composition for a heater which has and maintains both a low electrical-resistance value and a low TCR value.

It is a further object of this invention to provide a heat-generating composition for a heater which has a smaller difference between an initial current value, immediately after switching on the heater, and a regular current value at a high temperature, during use of the heater.

It is a still further object of this invention to provide a heat-generating composition for a heater which has at most about 1Ω/sq. of electrical-resistance by means of sintering the heat-generating composition at a low temperature of at most 1000° C., not only in a nitrogen atmosphere but also in air, to provide an economic advantage.

More specifically, the heat-generating composition according to this invention comprises an electrically conductive powder and a crystallizable glass frit, which are mixed with each other at the mixing weight ratio of from about 30:70 to about 95:5.

When the weight ratio of the electrically conductive powder is less than about 30 percent of the mixture, the electrical conductivity is degraded. When the weight ratio of the electrically conductive powder exceeds about 95 percent, it is difficult to properly sinter the mixture to form the final product.

According to a feature of this invention, a crystallizable glass frit having each of the below-mentioned three kinds of compositions produces a heater that has a good heat-resistance and a low electrical-resistance (high conductivity). Due to its crystalline structure, its rigidity, strength and resistance to cracking are enhanced.

Each of said compositions has the following ingredients:

| (A) | |
| --- | --- |
| $M^{II}O =$ | about 25 to about 45 weight percent |
| $B_2O_3 =$ | about 20 to about 60 weight percent |
| $M^{III}_2O_3 =$ | about 1 to about 5 weight percent |
| $M^I_2O =$ | about 0 to about 5 weight percent |
| $SiO_2 =$ | about 2 to about 10 weight percent |
| $Al_2O_3 =$ | about 2 to about 10 weight percent |
| $Bi_2O_3 =$ | about 0 to about 10 weight percent |
| Nuclear-forming agent = | about 0 to about 20 weight percent |
| (B) | |
| $M^{II}O =$ | about 25 to about 45 weight percent |
| $B_2O_3 =$ | about 20 to about 60 weight percent |
| $M^{III}_2O_3 =$ | about 0 to about 5 weight percent |
| $M^I_2O =$ | about 0 to about 5 weight percent |
| $SiO_2 =$ | about 2 to about 10 weight percent |
| $Al_2O_3 =$ | about 2 to about 10 weight percent |
| $Bi_2O_3 =$ | about 1 to about 10 weight percent |
| Nuclear-forming agent = | about 0 to about 20 weight percent |
| (C) | |
| $M^{II}O =$ | about 25 to about 45 weight percent |
| $B_2O_3 =$ | about 20 to about 60 weight percent |
| $M^{III}_2O_3 =$ | about 1 to about 5 weight percent |
| $M^I_2O =$ | about 0 to about 5 weight percent |
| $SiO_2 =$ | about 2 to about 10 weight percent |
| $Al_2O_3 =$ | about 2 to about 10 weight percent |
| $Bi_2O_3 =$ | about 1 to about 10 weight percent |
| Nuclear-forming agent = | about 0 to about 20 weight percent |

$M^I$ is one or more kinds of alkali metals selected from the group consisting of Li, Na, K, Rb, and Cs;

$M^{II}$ is one or more kinds of alkaline-earth metals selected from the group consisting of Mg, Ca, Sr, Ba, as well as others;

$M^{III}$ is one or more kinds selected from the group consisting of scandium, yttrium and lanthanide; a lanthanide is a generalized element from the periodic table of elements in the range of from lanthanum (La) to lutetium (Lu);

the nuclear-forming agent is one or more agents selected from the group consisting of $TiO_2$, $ZrO_2$, $P_2O_5$, $SnO_2$, $ZnO$, $MoO_3$, $Ta_2O_5$, $Nb_2O_5$, and $As_2O_3$.

Above-mentioned crystallizable glass means the glass which is essentially crystallized during sintering of the frit.

Because the heater sintered from the heat-generating composition of this invention has a low electrical-resistance, it can be made thinner, thereby a heater can be formed on the surface of a substrate. Thus, this invention provides an economic advantage.

Because the heater sintered from the heat-generating composition of this invention has a crystalline structure, the heater provides good heat-resistance and improved thermal shock resistance.

The electrically conductive fine powder includes at least one selected from the group consisting of molybdenum silicide, titanium silicide, tungsten silicide, nickel silicide, manganese silicide, tantalum silicide, silicon carbide, molybdenum carbide, and molybdenum boride.

According to a feature of this invention, there is provided a method for producing a heat-generating composition comprising: producing a crystallizable glass flake, pulverizing said crystallizable glass flake to a glass frit, mixing said glass frit with an electrically conductive powder to produce a mixture.

According to a further feature of this invention, there is provided a method for producing an electric heater comprising: producing a crystallizable glass flake, pulverizing said crystallizable glass flake to a glass frit, mixing said glass frit with an electrically conductive powder to produce a mixture, mixing said mixture with a vehicle to produce a paste, coating a layer of said paste on a supporting material, and firing said layer and said supporting material to produce said heater.

According to a further feature of this invention, a glass overcoating may be applied over the heater. The glass overcoat may be applied over the paste before sintering. Alternatively, the glass overcoat may be applied over the heater after sintering.

According to a further feature of this invention, a heat-generating composition which comprises a molybdenum silicide as an electrically conductive powder, a glass frit, and an additive. The additive includes at least one metal oxide powder and/or metal powder. The metal is at least one selected from the group consisting of nickel, manganese, iron, bismuth, copper, and silver. The metal oxide is at least one selected from the group consisting of nickel oxides, manganese oxides, iron oxides, bismuth oxides, copper oxides, and silver oxides. The addition of metal oxide powder and/or metal powder results in a heater which has both a low electrical-resistance value and a low TCR value.

According to a further feature of this invention, there is provided a heat-generating composition comprising a molybdenum silicide as an electrically conductive powder, a glass frit, wherein a weight ratio of the molybdenum silicide to the glass frit is in a range of from about 50:50 to about 75:25, and an additive, which lowers both the electrical-resistance and the temperature coefficient of resistance (TCR) of the heater sintered from the heat-generating composition. The additive is at least one of a metal oxide powder and/or a metal powder.

According to a further feature of this invention, there is provided a method for producing a heater comprising mixing a molybdenum silicide, as an electrically conductive powder, a glass frit, and an additive to create a mixture, a weight ratio of the molybdenum silicide to the glass frit being in a range of from about 50:50 to about 75:25, the additive being of a type and in a weight ratio, which lowers both an electrical-resistance and a temperature coefficient of resistance (TCR) of the heater, mixing with or without a vehicle, and sintering the mixture to produce a heater. Said heater has both a low electrical-resistance value and a low temperature coefficient of resistance. Such a composition results in the formation of a desirable heat-generating pattern, improvement in the thermal shock resistance. Since the difference between the initial current and regular current is smaller, the equipment loaded with this heater can be compact. Additionally, since the temperature coefficient of resistance (TCR) is low, the heater sintered from the heat-generating composition generates heat uniformly.

According to a further feature of this invention, there is provided a heat-generating composition comprising both molybdenum silicide and nickel silicide as electrically conductive powder, a glass frit, and nickel powder as an additive, a weight ratio of the nickel silicide to the total weight of the molybdenum silicide, the nickel silicide, and the glass frit being in a range of from about 5:100 to about 22:100, a weight ratio of the sum of the electrically conductive powder to the glass frit being in a range of from about 60:40 to about 75:25, and a weight ratio of the nickel powder to a total weight of the molybdenum silicide, the nickel silicide, and the glass frit being in a range of from about 0.1:100 to about 12:100.

The preferable weight ratio of the nickel silicide to the total weight of the molybdenum silicide, the nickel silicide, and the glass frit is in a range of from about 8:100 to about 18:100.

The preferable weight ratio of the sum of the electrically conductive powder to the glass frit is in a range of from about 64:36 to about 72:28.

The preferable weight ratio of the nickel powder to the total weight of the molybdenum silicide, the nickel silicide, and the glass frit is in a range of from about 0.5:100 to about 6:100.

According to a further feature of this invention, there is provided a method for producing a heater comprising mixing a molybdenum silicide as an electrically conductive powder, a nickel silicide as an electrically conductive powder, a glass frit, and a nickel powder as an additive in accordance with above-mentioned weight ratio to create a mixture, mixing with or without a vehicle, and sintering the mixture at a relatively low temperature in a nitrogen atmosphere or in air to produce a heater.

The above, and other objects, features and advantages of this invention will become apparent from the following description read in conjunction with the accompanying drawings.

DETAILED DESCRIPTION OF THE PREFERRED EMBODIMENT

Figure 1:
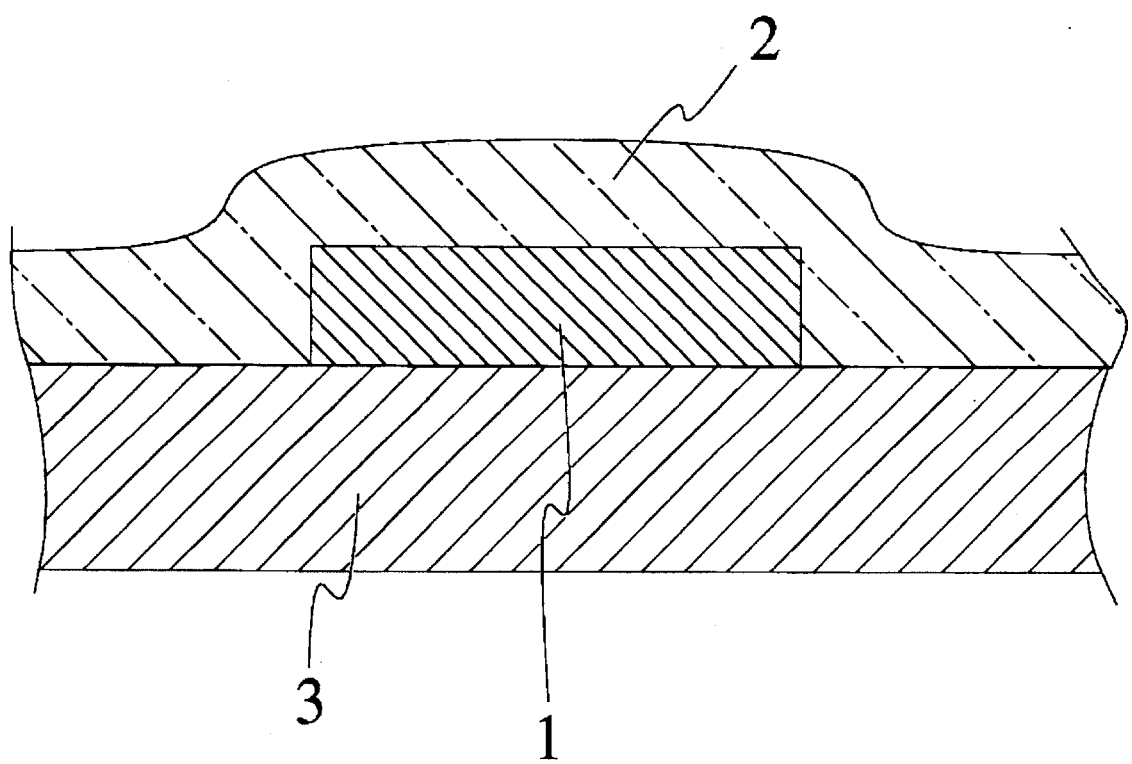
FIG. 1 shows a sectional view of a heater with a glass layer coating.

Referring to FIG. 1, a heater 1 is sintered from a heat-generating composition on a substrate 3. The heat-generating composition and the substrate 3 are subjected to an elevated temperature for a period of time necessary to sinter the material of the heat-generating composition, and than an electric heater is formed. A glass layer 2 is coated on heater 1 to provide protection and electrical insulation. Glass layer 2 is applied as a frit in the form of a paste. This assembly is baked at an elevated temperature to sinter the frit to glass layer 2. A heater formed in this manner was maintained for 1,000 hours in 95 percent relative humidity at a temperature of 60° C., and no change in the electrical-resistance value was observed. Thus, a desirable heater was produced.

Glass layer 2 has a thermal expansion coefficient that generally corresponds to the thermal expansion coefficient of heater 1. Preferably, glass layer 2 contains materials that are inert to heater 1. Glass layer 2 may be sintered simultaneously with the heat-generating composition by selecting a composition for the glass layer 2 that is compatible with the heat-generating composition.

The heat-generating composition is formed into a paste which is printed onto substrate 3 and is thereafter sintered to produce a heater 1. Alternatively, the paste containing the heat-generating composition is placed between green sheets (raw substrates 3) and sintered.

In another alternative, the pressed mixture containing the heat-generating composition may be sintered as it is, or may be embedded in a ceramic powder and then sintered.

In yet another alternative, the mixture containing the heat-generating composition is shaped as a rod and then sintered.

In case of using no additive, it is essential that the glass frit is crystallized during sintering the heat-generating composition.

The following are the ingredients and their weight ratio of the glass frit which is used as the binder of the heat-generating composition, according to an embodiment of the invention:

| (D) | |
|---|---|
| $M^{II}O =$ | about 5 to about 50 weight percent |
| $B_2O_3 =$ | about 20 to about 80 weight percent |
| $M^{III}_2O_3 =$ | about 0 to about 10 weight percent |
| $M^{I}_2O =$ | about 0 to about 5 weight percent |
| $SiO_2 =$ | about 0 to about 40 weight percent |
| $Al_2O_3 =$ | about 0 to about 40 weight percent |
| $Bi_2O_3 =$ | about 0 to about 10 weight percent |
| Nuclear-forming agent = | about 0 to about 20 weight percent |

$M^I$ is one or more kinds of alkali metals selected from the group consisting of Li, Na, K, Rb and Cs;

$M^{II}$ is one or more kinds of alkaline-earth metals selected from the group consisting of Mg, Ca, Sr, Ba, as well as others.

$M'''$ is one or more kinds selected from the group consisting of scandium, yttrium, and lanthanide; a lanthanide is a generalized element from the periodic table of elements in the range of from lanthanum (La) to lutetium (Lu);

the nuclear-forming agent is one or more agents selected from the group consisting of $TiO_2$, $ZrO_2$, $P_2O_5$, $SnO_2$, ZnO, $MoO_3$, $Ta_2O_5$, $Nb_2O_5$, and $As_2O_3$.

The reasons for requiring the aforesaid ingredients and their weight ratios are as follows.

For forming a crystal phase of $M''O.xB_2O_3$, $M''O$ and $B_2O_3$ are both indispensable constituents. The production of the crystal phase has been confirmed for the metals Ca and Mg. Although not confirmed, it is believed that the remaining metals listed in the group making up $M''$ may also give rise to the crystal phase in the same, or different formulation. The proportion of $M''O$ and $B_2O_3$ has a substantial influence on the electrical-resistance value of a resulting heater.

If the amount of $M''O$ is less than about 5 weight percent, a boron oxide oriented glass is produced, and exsolution (separation of chemical components) may occur at a critical point in temperature during the glass melting process. This prevents the formation of a homogeneous glass. If $M''O$ exceeds about 50 weight percent, the relative amount of $B_2O_3$ in the glass is decreased. As a consequence, the electrical-resistance value of the heater is increased (the conductivity is decreased), and formation of a glass having suitable properties becomes difficult. Preferably, the weight percent of $M''O$ is from about 25 to about 45.

If the amount of $B_2O_3$ is less than about 20 weight percent, the electrical-resistance value of the heater is increased. If the amount of $B_2O_3$ is greater than about 80 weight percent, boron oxide is exsolved in the glass melting process. This prevents the production of a homogeneous glass. As the weight percent of $B_2O_3$ increases from about 20 to about 80, the increasing quantity of $B_2O_3$ decreases the electrical-resistance value. Preferably, the weight percent of $B_2O_3$ is from about 20 to about 60.

A small amount of $M'''_2O_3$ enhances the strength of adhesion between the heater and a substrate on which the heater is formed. Preferably, the weight percent of $M'''_2O_3$ is from about 0 to about 10. If the weight percent of $M'''_2O_3$ exceeds about 10, the desired improvement in adhesion is not obtained. More preferably, it is from about 1 to about 5.

If more than about 5 weight percent $M'_2O$ is present, when the resulting heater is used, alkali ion transfer results in being altered the electrical-resistance value of the heater. Therefore, the weight percent of $M'_2O$ is preferably less than about 5, and more preferably about 0 (zero). In fact, $M'_2O$ is contained as impurities in most sources of glass raw material, in which it constitutes less than about 0.1 weight percent.

A preferred quantity of $SiO_2$ is added to obtain a stable glass. The weight percent of $SiO_2$ is preferably less than about 40. If the weight percent of $SiO_2$ exceeds about 40, the weight percent of $B_2O_3$ is relatively reduced. As a consequence, the electrical-resistance value of the heater is increased; i.e., undesirable. The weight percent of $SiO_2$ is more preferably from about 2 to about 10.

Like $SiO_2$, a preferred quantity of $Al_2O_3$ is added to obtain a stable glass. If the weight percent of $Al_2O_3$ exceeds about 40, the weight percent of $B_2O_3$ is relatively reduced. This is undesirable since it increases the electrical-resistance value of the heater. The weight percent of $Al_2O_3$ is more preferably from about 2 to about 10.

A preferred quantity of $Bi_2O_3$ is added to enhance adhesion between the heater and the substrate, and to decrease the electrical-resistance value. If the weight percent of $Bi_2O_3$ exceeds about 10, the physical properties of the glass are changed. Preferably, the weight percent of $Bi_2O_3$ is about 1 to about 10. More preferably, it is about 5 to about 10.

The nuclear-forming agent encourages the formation of a crystal phase. Usually, the quantity of the nuclear-forming agent is less than about 20 weight percent. In some situations, suitable crystallization of the glass results from selecting a preferred composition of the glass. In that case, a nuclear-forming agent may be omitted.

As discussed above, the crystal phase of $M'''O.xB_2O_3$ (where x=0.3 to 3) is produced, whereby the heater sintered from the heat-generating composition according to this invention can be highly heat-resistant and exhibit a low electrical-resistance.

Further, a reaction may occur between the crystallizable glass and certain kinds of electrically conductive powder such as, for example, molybdenum silicide to produce a low electrical-resistance layer consisting of, for example, MoB at the interface between the $MoSi_2$ and the glass frit. This forms an electrically conductive layer which reduces the electrical-resistance value of the heater. The existence of MoB has been confirmed by X-ray diffractometry.

Still further, since the heat-generating composition according to this invention has certain specified ingredients and desired mixing ratio of the electrically conductive powder and the crystallizable glass frit, resistance to heat, thermal shock and impact, as well as a low electrical-resistance, can be attained. A suitable heater can be produced using a thin layer of the material. As a consequence, this invention promises improved economic advantages and broader industrial application.

Although above-mentioned glass frit has to be crystallized, if some additives are used as a component of the heat-generating composition, it is not necessary that the glass frit is crystallized during sintering the heat-generating composition.

Namely, according to more improved this invention, the heat-generating composition which comprises a molybdenum silicide as an electrical conductive powder, a glass frit, and an additive. The additive includes at least one metal oxide powder an/or metal powder.

When the molybdenum silicide is sole electrically conductive powder, it is preferable that the weight ratio of the molybdenum silicide to the glass frit is from about 50:50 to about 75:25. It is more preferable that the weight ratio of the molybdenum silicide to the glass frit is from about 55:45 to about 70:30, since an optimum balance between the electrical-resistance and the temperature coefficient of resistance (TCR) is obtained.

Figure 2A:
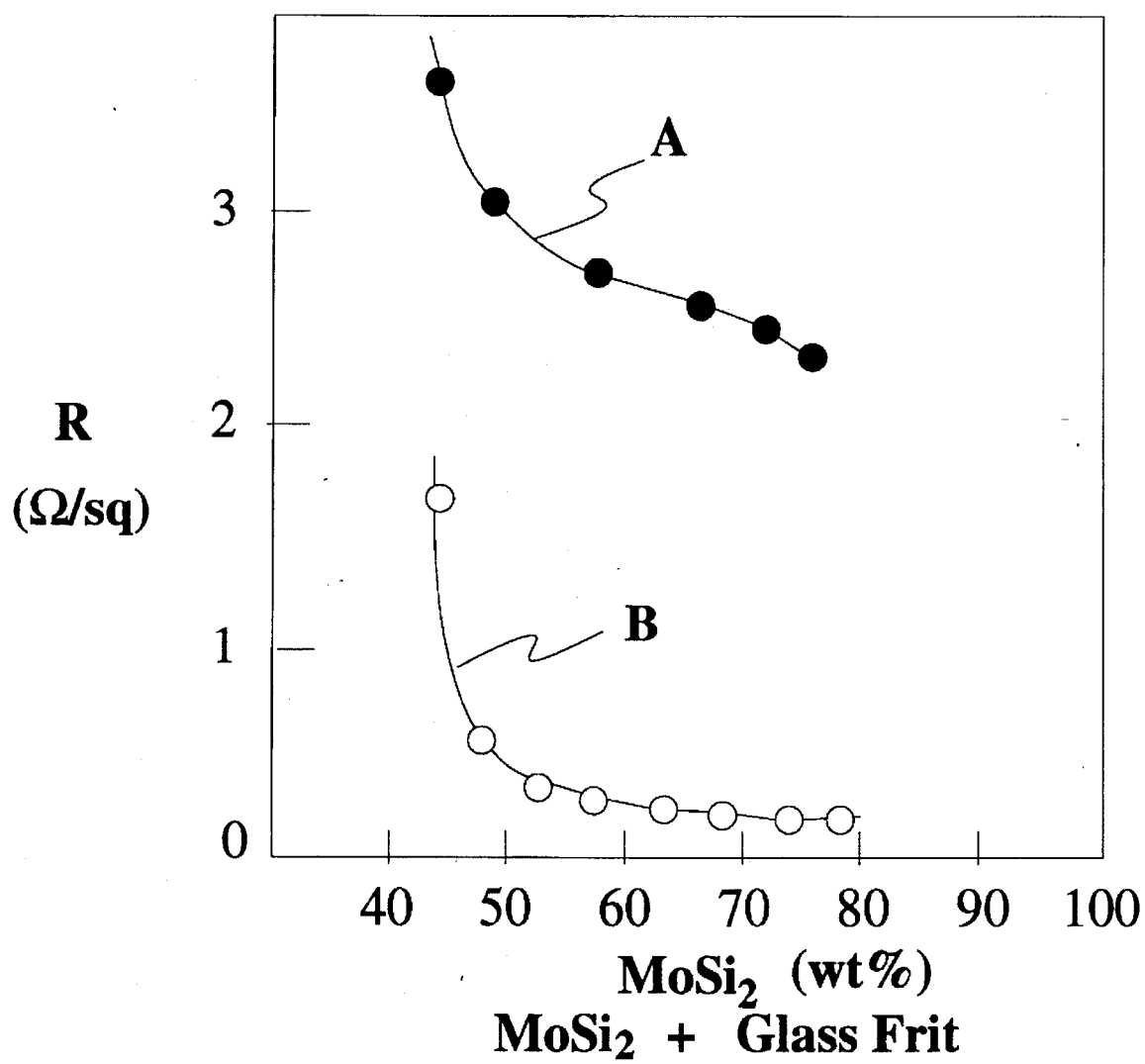
FIGS. 2a and 2b show the effects of the additive in various ratios of the molybdenum silicide to the sum of the molybdenum silicide and the glass frit.
Figure 2B:
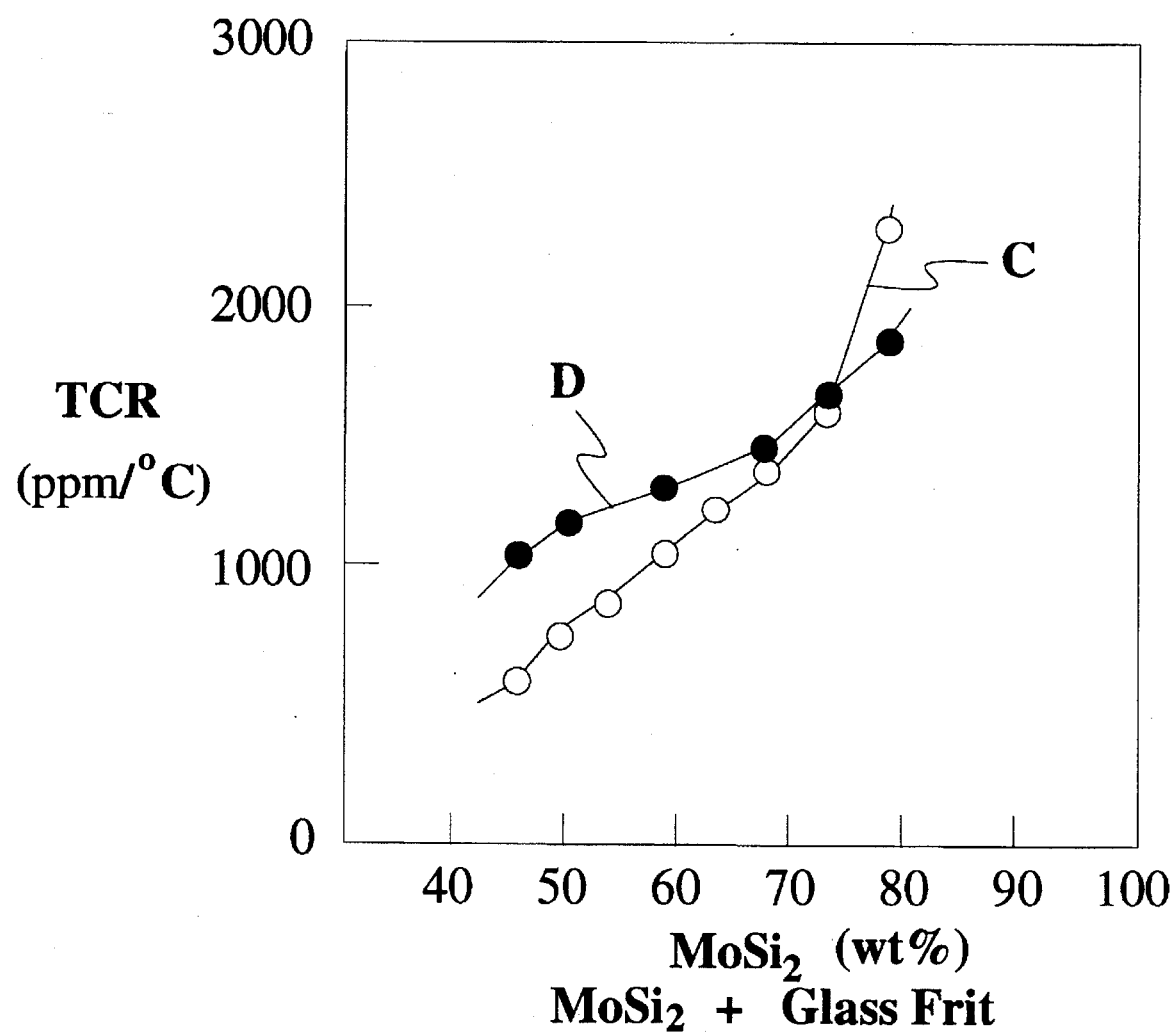

FIG. 2a and 2b show the effects of the additive in various ratios of the molybdenum silicide to the sum of the molybdenum silicide and the glass frit. In FIG. 2a and FIG. 2b, ● indicates no additive and ○ indicates additives including 15 wt % Cu and 4 wt % $Fe_2O_3$.

In FIG. 2a, line A refers to composition numbers 1–6 in Table 1, and line B refers to numbers 7–13 in Table 1.

As shown in Table 1 and FIG. 2a, line B, when the weight ratio of the molybdenum silicide to the glass frit approaches about 50:50, a decrease in the electrical-resistance is particularly observed only when additives are used. Further, when this ratio increases from about 50:50 to about 75:25, a decrease in the electrical-resistance is more and more observed.

As shown in Table 1 and FIG. 2a, line A, however, when additives are not used, the electrical-resistance of the heater only gradually decreases, and does not sharply decrease.

As shown in FIG. 2a, line A and line B, additionally, the electrical-resistance of the heater is higher when additives are not used.

In FIG. 2b, line C refers to numbers 7–13 in Table 1 and line D refers to numbers 1–6 in Table 1.

As shown in FIG. 2a and FIG. 2b, an increase in the weight ratio of the molybdenum silicide to the glass frit has an effect on the temperature coefficient of resistance (TCR) value which is opposite to that on the electrical-resistance.

As shown in FIG. 2b, line C and line D, when weight ratio of the molybdenum silicide to the glass frit decreases from about 75:25, when additives are used, the TCR value is lower than the TCR value without the additives.

As shown in FIG. 2b, line C and line D, further, the TCR value with the additives decreases with a steeper slope in comparison to the TCR value without the additive.

Additionally, when the weight ratio of the molybdenum silicide to the glass frit is greater than about 75:25, the result is a lack of heat-resistance in response to a repetition of increasing and decreasing temperature. The lack of heat-resistance occurs because an increase of the weight ratio of the molybdenum silicide to the glass frit results in an increase of the thermal expansion coefficient of the heater. Other reasons for a lack of heat-resistance are an imperfect sintering of the heater and a decrease of adhesion to substrate, both of which are caused by a decrease of the glass phase.

Another important reason to use at least 50 weight percent of the molybdenum silicide, to the sum of the molybdenum silicide and the glass frit, is to ensure the heater has a desirable appearance. As previously mentioned in reference to FIG. 1, a glass layer is coated on the heater to provide electrical insulation, oxidation durability, smooth surface, etc. When the weight ratio of the molybdenum silicide to the glass frit is less than about 50:50, the glass frit in the heat-generating composition reacts with the glass coating, during sintering, to generate a rough surface.

The glass frit used in the heat-generating composition including additives has the following ingredients:

| (E) | |
|---|---|
| $M^{II}O =$ | about 5 to about 50 weight percent |
| $B_2O_3 =$ | about 20 to about 80 weight percent |
| $M^{III}_2O_3 =$ | about 0 to about 10 weight percent |
| $M^I_2O =$ | about 0 to about 5 weight percent |
| $SiO_2 =$ | about 0 to about 40 weight percent |
| $Al_2O_3 =$ | about 0 to about 40 weight percent |
| $Bi_2O_3 =$ | about 0 to about 10 weight percent |
| $TiO_2 =$ | about 5 to about 20 weight percent |
| Nuclear-forming agent = | about 0 to about 20 weight percent |

The preferred ingredients are the following:

| (F) | |
|---|---|
| $M^{II}O =$ | about 25 to about 45 weight percent |
| $B_2O_3 =$ | about 20 to about 60 weight percent |
| $M^{III}_2O_3 =$ | about 0 to about 5 weight percent |
| $M^I_2O =$ | about 0 to about 5 weight percent |
| $SiO_2 =$ | about 2 to about 10 weight percent |

| -continued | |
|---|---|
| (F) | |
| $Al_2O_3 =$ | about 2 to about 10 weight percent |
| $Bi_2O_3 =$ | about 0 to about 10 weight percent |
| $TiO_2 =$ | about 8 to about 17 weight percent |
| Nuclear-forming agent = | about 0 to about 20 weight percent |

$M^I$ is one or more kinds of alkali metals selected from the group consisting of Li, Na, K, Rb and Cs;

$M^{II}$ is one or more kinds of alkaline-earth metals selected from the group consisting of Mg, Ca, Sr, Ba, as well as others;

$M^{III}$ is one or more kinds selected from the group consisting of scandium, yttrium and lanthanide; a lanthanide is a generalized element from the periodic table of elements in the range of from lanthanum (La) to lutetium (Lu);

the nuclear-forming agent is one or more agents selected from the group consisting of $ZrO_2$, $P_2O_5$, $SnO_2$, $ZnO$, $MoO_3$, $Ta_2O_5$, $Nb_2O_5$, and $As_2O_3$.

Figure 3:
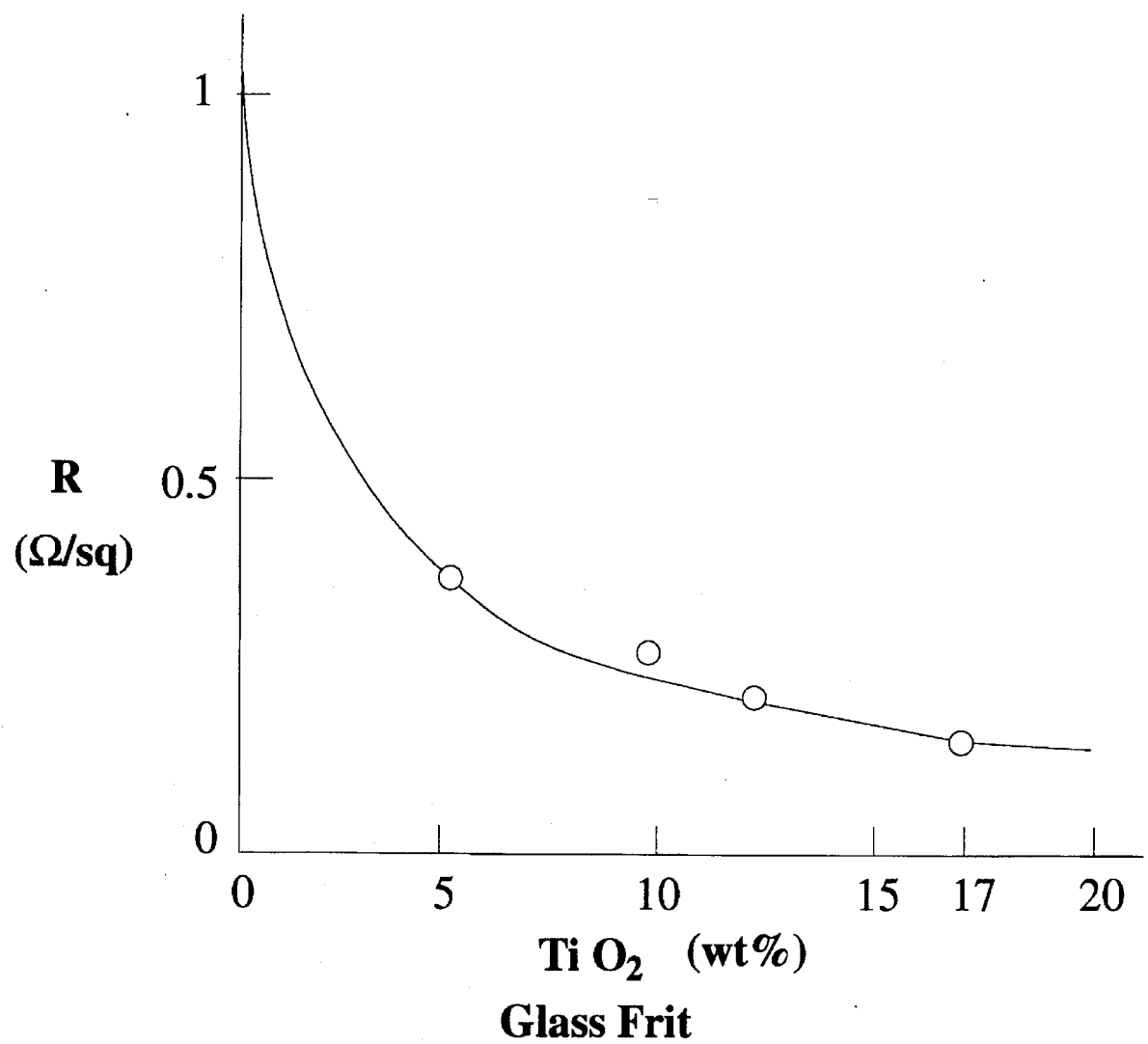
FIG. 3 shows the relationship between the content of titanium oxide in the glass frit and the electrical-resistance value.

As shown in FIG. 3, when the titanium oxide is used as a glass-forming component, from about 5 to about 8 weight percent in the glass frit, the electrical-resistance of the heater sharply decreases. Additionally, the use of titanium oxide improves the heat-resistance in repetition of increasing and decreasing temperature.

When there is less than about 5 weight percent of titanium oxide in the glass frit, the electrical-resistance of the heater cannot be lowered effectively. On the other hand, when there is more than about 20 weight percent of titanium oxide in the glass frit, the glass melting process is difficult. It is preferable to use from about 8 to about 17 weight percent of titanium oxide in the glass frit, to optimize effects and minimize expense. Thus, the cost of melting are minimized, and the difficulties encountered in the melting process are minimized.

In case of using additives, it is preferable to use a crystallizable glass as the glass frit, however, an amorphous glass frit can be used. If the glass frit has the above ingredients E or F, then it is not necessary to use crystallizable glass as the glass frit. Crystallizable glass frit is a type of glass frit which is crystallized during sintering of the frit.

Finally, at least one metal oxide powder and/or metal powder is used as the additive in the heater sintered from the heat-generating composition of this invention to lower both the electrical-resistance and TCR values simultaneously.

When the electrical-resistance is low, the heater can be thinner, and also an arbitrary pattern for the uniform heat generation of the ceramic heater can be formed.

When the temperature coefficient of resistance (TCR) is low, it decreases a difference between an initial current value, immediately after switching on the heater, and a regular current value at a high temperature, during use of the heater. As a result, the heater sintered from the heat-generating composition of this invention, having a low TCR, is suitable for personal use. Additionally, a heater having a low TCR value generates heat uniformly.

The additive is used in an amount of from about 1 to about 20 weight percent based on the weight of the mixture of the molybdenum silicide, as the electrically conductive powder, and the glass frit. When the metal oxide powder and/or metal powder is added in an amount of less than about 1 weight percent, the electrical-resistance and TCR values are not lowered as expected. When the metal oxide powder and/or metal powder is added in an amount of more than about 20 weight percent, the thermal expansion coefficient of the heater becomes larger. As a result, the difference between the thermal expansion of the heater and that of a substrate becomes larger which results in warpage and a lack of heat-resistance. Additionally, the electrical-resistance and TCR values are not simultaneously decreased as expected.

When only metal oxide powder is used as the additive, it is preferable to use at least one metal oxide powder selected from the group consisting of nickel oxides, manganese oxides, iron oxides, bismuth oxides, copper oxides, and silver oxides.

When using only metal powder as the additive, it is preferable to use at least one metal powder selected from the group consisting of nickel, copper, and silver.

When a combination of at least one metal oxide powder and at least one metal powder is used, the metal powder is selected from the group consisting of nickel, manganese, iron, bismuth, copper, and silver, and the metal oxide powder is selected from the group consisting of nickel oxides, manganese oxides, iron oxides, bismuth oxides, copper oxides, and silver oxides. Among the above additives, the combination of at least one metal oxide powder and at least one metal powder yields the best results.

Further, a heat-generating composition according to more improved this invention, which comprises a molybdenum silicide as an electrically conductive powder, a nickel silicide as an electrically conductive powder, a glass frit, and a nickel powder as an additive.

In this case, it is not necessary that the glass frit is crystallized during sintering the heat-generating composition.

Using the nickel silicide as an electrically conductive powder combined with the molybdenum silicide as another electrically conductive powder, the heater can be produced by means of sintering the heat-generating composition at a relatively low temperature, because the nickel silicide has a lower melting point (993° C.) than that of molybdenum silicide (2020° C.).

Figure 4:
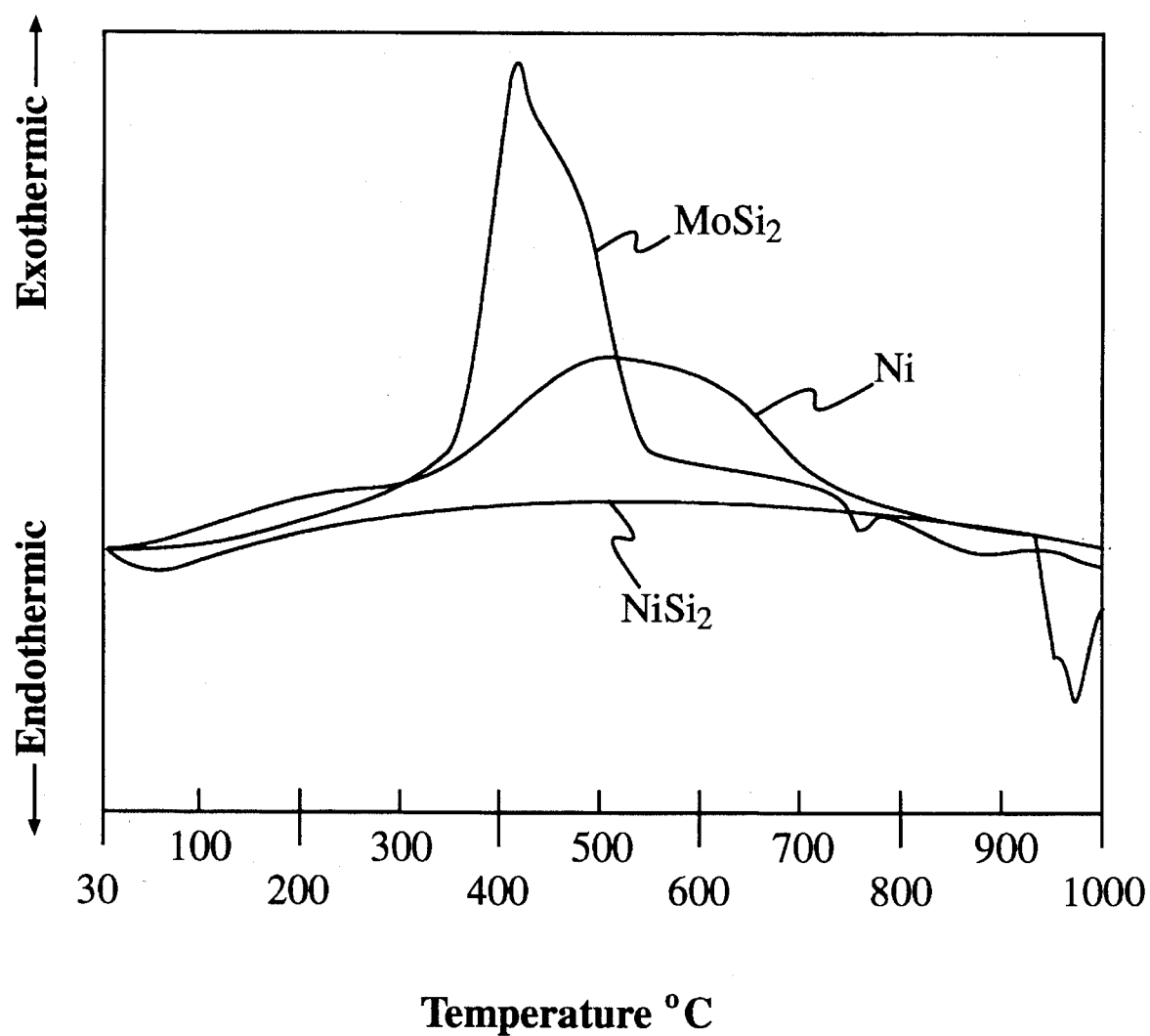
FIG. 4 shows the DTA (Differential Thermal Analysis) curves of the molybdenum silicide, the nickel silicide, and the nickel in air, respectively.

Furthermore, as shown in FIG. 4, the nickel silicide is difficult to be oxidized a in comparison with the molybdenum silicide. Consequently, when the nickel silicide is used in combination with the molybdenum silicide, the heat-generating composition can be sintered even in air, without greatly increasing the electrical-resistance of resulting heater.

However, the electrical-resistance value of the resulting heater can not be lowered sufficiently, because the resistivity of the nickel silicide is higher than that of the molybdenum silicide. This problem can be solved by means of adding the nickel powder, since the nickel has the resistivity between that of the nickel silicide and that of the molybdenum silicide.

In the meantime, although the melting point of the nickel (1455° C.) is higher than that of the nickel silicide, it is lower than that of the molybdenum silicide as mentioned above.

Although the nickel is more oxidized than the nickel silicide, the nickel is less oxidized than the molybdenum silicide as shown in FIG. 4.

When the mixture having the desirable weight ratio of the molybdenum silicide, the nickel silicide, the nickel is mixed with the glass frit, the heat-generating composition can be sintered even in air without raising the sintering temperature to produce a heater having the sufficiently low electrical-resistance value.

When the weight ratio of the nickel silicide to the total weight of the molybdenum silicide, the nickel silicide, and the glass frit is less than about 5:100, resulting heater, which is sintered in air, has an extremely high electrical-resistance value. When the weight ratio of the nickel silicide to the total weight of the molybdenum silicide, the nickel silicide, and the glass frit is more than about 22:100, resulting heater has a high electrical-resistance value. It is preferable that this weight ratio is in a range of from about 8:100 to about 18:100.

When the weight ratio of the total amount of silicides to the glass frit is less than about 60:40, a low electrical-resistance value is not achieved. On the other hand, when the weight ratio of the total amount of silicides to the glass frit is more than about 75:25, a low electrical-resistance value of the heater is not only achieved, but the heat-resistance in repetition of increasing and decreasing temperature is also degraded. It is preferable that this weight ratio is in a range of from about 64:36 to about 72:28.

When the weight ratio of the nickel to the total amounts of silicides and the glass frit is less than about 0.1:100, an electrical-resistance value of resulting heater does not decrease. On the other hand, when the weight ratio of the nickel to the total amounts of silicides and the glass frit more than about 12:100, the electrical-resistance value increase. And also, in this case, since the thermal expansion coefficient of the heater becomes larger, the difference between the thermal expansion of the heater and that of a substrate becomes larger. As a result, heat-resistance in repetition of increasing and decreasing temperature is degraded. It is preferable that this weight ratio is in a range of from about 0.5:100 to about 6:100.

The glass frit used in the heat-generating composition including additives has the following ingredients:

| (D) | |
|---|---|
| $M^{II}O =$ | about 5 to about 50 weight percent |
| $B_2O_3 =$ | about 20 to about 80 weight percent |
| $M^{III}_2O_3 =$ | about 0 to about 10 weight percent |
| $M^I_2O =$ | about 0 to about 5 weight percent |
| $SiO_2 =$ | about 0 to about 40 weight percent |
| $Al_2O_3 =$ | about 0 to about 40 weight percent |
| $Bi_2O_3 =$ | about 0 to about 10 weight percent |
| Nuclear-forming agent = | about 0 to about 20 weight percent |

$M^I$ is one or more kinds of alkali metals selected from the group consisting of Li, Na, K, Rb and Cs;

$M^{II}$ is one or more kinds of alkaline-earth metals selected from the group consisting of Mg, Ca, Sr, Ba, as well as others.

$M^{III}$ is one or more kinds selected from the group consisting of scandium, yttrium, and lanthanide; a lanthanide is a generalized element from the periodic table of elements in the range of from lanthanum (La) to lutetium (Lu);

the nuclear-forming agent is one or more agents selected from the group consisting of $TiO_2$, $ZrO_2$, $P_2O_5$, $SnO_2$, ZnO, $MoO_3$, $Ta_2O_5$, $Nb_2O_5$, and $As_2O_3$.

The preffered ingredients are the following:

| (E) | |
|---|---|
| $M^{II}O =$ | about 5 to about 50 weight percent |
| $B_2O_3 =$ | about 20 to about 80 weight percent |
| $M^{III}_2O_3 =$ | about 0 to about 10 weight percent |

-continued (E)

| | |
|---|---|
| $M^I_2O =$ | about 0 to about 5 weight percent |
| $SiO_2 =$ | about 0 to about 40 weight percent |
| $Al_2O_3 =$ | about 0 to about 40 weight percent |
| $Bi_2O_3 =$ | about 0 to about 10 weight percent |
| $TiO_2 =$ | about 5 to about 20 weight percent |
| Nuclear-forming agent = | about 0 to about 20 weight percent |

$M^I$ is one or more kinds of alkali metals selected from the group consisting of Li, Na, K, Rb and Ca;

$M^{II}$ is one or more kinds of alkaline-earth metals selected from the group consisting of Mg, Ca, Sr, Ba, as well as others.

$M^{III}$ is one or more kinds selected from the group consisting of scandium, yttrium, and lanthanide; a lanthanide is a generalized element from the periodic table of elements in the range of from lanthanum (La) to lutetium (Lu);

the nuclear-forming agent is one or more agents selected from the group consisting of $ZrO_2$, $P_2O_5$, $SnO_2$, ZnO, $MoO_3$, $Ta_2O_5$, $Nb_2O_5$, and $As_2O_3$.

$M^{III}$ is one or more kinds selected from the group consisting of scandium, yttrium, and lanthanide; a lanthanide is a generalized element from the periodic table of elements in the range of from lanthanum (La) to lutetium (Lu);

the nuclear-forming agent is one or more agents selected from the group consisting of $ZrO_2$, $P_2O_5$, $SnO_2$, ZnO, $MoO_3$, $Ta_2O_5$, $Nb_2O_5$, and $As_2O_3$.

EXAMPLE 1

Glass compositions having the ingredients and proportions listed in Table 1 were made. Said glass compositions belong to the above-mentioned glass composition A, B, or C, according to this invention. The following process was used to produce a crystallizable glass frit.

The glass compositions 1 to 8 in Table 1 were made using carbonate, hydroxide, oxide, or the like as raw materials. In according with a conventional process, the mixture of raw materials, which resulted in the glass compositions 1 to 8, were melted for 60 minutes at a temperature of 1,350° C., then rapidly cooled by a twin roller. The resulting intermediate product was a glass flake (glass compositions 1 to 8). The glass flake was pulverized for 6 hours in a ball mill to produce a glass frit. The average particle diameter was from about 2 to about 3

TABLE 1

| | GLASS COMPOSITION (WEIGHT PERCENT) | | | | | | | | |
|---|---|---|---|---|---|---|---|---|---|
| Composition (wt %) | 1 | 2 | 3 | 4 | 5 | 6 | 7 | 8 | Comparative Example |
| MgO | 2.9 | 2.5 | 2.9 | 1.9 | 1.8 | 1.9 | 6.5 | 35.3 | 3.7 |
| CaO | 1.6 | 1.5 | 1.8 | 3.2 | 3.1 | 3.2 | 28.8 | — | 2.1 |
| BaO | 22.3 | 41.0 | 22.3 | 30.8 | 30.0 | 30.0 | — | — | 38.6 |
| $B_2O_3$ | 40.7 | 23.8 | 40.7 | 39.5 | 38.3 | 38.3 | 53.1 | 53.1 | 42.0 |
| $SiO_2$ | 3.9 | 3.3 | 3.9 | 4.3 | 4.2 | 4.3 | 3.8 | 3.8 | 4.9 |
| $Al_2O_3$ | 6.7 | 5.8 | 6.7 | 6.6 | 6.3 | 6.6 | 3.8 | 3.8 | 8.7 |
| $TiO_2$ | 16.9 | 12.3 | 15.9 | 11.7 | 11.3 | 11.7 | — | — | — |
| $Y_2O_3$ | 5.0 | — | — | — | — | — | — | 4.0 | — |
| $La_2O_3$ | — | — | 5.0 | 2.0 | — | 2.0 | — | — | — |
| $Bi_2O_3$ | — | 10.0 | — | — | 5.0 | 2.0 | 4.0 | — | — |
| Glass Transition Temp. (°C.) | 585 | 568 | 585 | 580 | 568 | 575 | 800 | 645 | 583 |
| Temperature of Crystallization (°C.) | 685 | 720 | 680 | 780 | 755 | 755 | 790 | 734 | — |

Note:
Less than about 0.1 weight percent of $H^r_2O$ is found as an impurity in most raw materials for glass. This amount is small enough to be ignored.

The more preferred ingredients are the following:

(F)

| | |
|---|---|
| $M^{II}O =$ | about 25 to about 45 weight percent |
| $B_2O_3 =$ | about 20 to about 60 weight percent |
| $M^{III}_2O_3 =$ | about 0 to about 5 weight percent |
| $M^I_2O =$ | about 0 to about 5 weight percent |
| $SiO_2 =$ | about 2 to about 10 weight percent |
| $Al_2O_3 =$ | about 2 to about 10 weight percent |
| $Bi_2O_3 =$ | about 0 to about 10 weight percent |
| $TiO_2 =$ | about 8 to about 17 weight percent |
| Nuclear-forming agent = | about 0 to about 20 weight percent |

$M^I$ is one or more kinds of alkali metals selected from the group consisting of Li, Na, K, Rb and Ca;

$M^{II}$ is one or more kinds of alkaline-earth metals selected from the group consisting of Mg, Ca, Sr, Ba, as well as others;

micrometers.

A crystallizable glass frit having a glass composition 1 in Table 1 was fully mixed with silicon carbide (SiC) as an electrically conductive powder having particle diameters from about 0.1 to several micrometers at the weight percents shown in column A of Table 2. Subsequently, the mixture was fully mixed with a vehicle, which includes an organic polymer (e.g. acrylic resin) as a binder and organic solvents, at a weight percent of about 80:20, to produce a paste.

The paste was printed upon an mullite substrate at a thickness of 20 micrometers, by means of a 200 mesh screen, dried for 30 minutes at a temperature of 130° C. and baked for 10 minutes at a temperature of 1,200° C. in a nitrogen atmosphere. The resulting products were cooled. Then, their electrical-resistance values (ohms/square) of the resulting heaters were measured by a 4-terminal method. The results are shown in the column 1 of Table 2.

The crystallizable glass frit having a glass composition 1 was fully mixed with tungsten silicide($WSi_2$), having an average particle diameter about 3 micrometers, in the weight percentages shown in column A of Table 2. Subsequently, the mixture was fully mixed with a vehicle, which includes an organic polymer (e.g. acrylic resin) as a binder and organic solvents, at a weight percent of about 80:20, to produce a paste. The paste was printed, at a thickness of 20 micrometers, on an alumine substrate by means of 200 mesh screen, dried for 30 minutes at a temperature of 130° C. and baked for 10 minutes at a temperature of 1,000° C. in a nitrogen atmosphere. The resulting products were cooled. Then, their electrical-resistance values (ohms/square) were measured. The results are shown in column 2 of Table 2.

The crystallizable glass frit having glass composition 2 to 8 were fully mixed with molybdenum silicide ($MoSi_2$), having an temperature of 130° C. and baked for 10 minutes at a temperature of 1,000° C. in a nitrogen atmosphere. The resulting products were cooled. Then, their electrical-resistance values (ohms/square) were measured. The results are shown in Comparative Example column of Table 2.

RESULTS

As discussed above, it is to be understood that the electrical-resistance value of each heater in columns 1 to 9 is reduced to value from about one fifth to about one twentieth of each electrical-resistance value in the Comparative Example 1. Such lower electrical-resistance values permit producing a heater that is much thinner than the prior

TABLE 2

| | ELECTRICAL-RESISTANCE VALUE (OBMS/SQUARE) | | | | | | | | | |
|---|---|---|---|---|---|---|---|---|---|---|
| | 1 | 2 | 3 | 4 | 5 | 6 | 7 | 8 | 9 | Comparative Example |
| Electrically Conductive Powder | SiC | $WSi_2$ | $MoSi_2$ | $MoSi_2$ | $MoSi_2$ | $MoSi_2$ | $MoSi_2$ | $MoSi_2$ | $MoSi_2$ | $MoSi_2$ |
| Glass Composition No. | 1 | 1 | 2 | 3 | 4 | 5 | 6 | 7 | 8 | See Table 1 |
| A | | | | | | | | | | |
| 30/70 | 8.5 | 9.7 | 10.5 | 11.3 | 12.9 | 8.4 | 10.0 | 8.7 | 12.0 | — |
| 50/50 | 2.1 | 3.8 | 1.5 | 1.5 | 5.5 | 3.7 | 4.4 | 4.5 | 7.5 | 31.5 |
| 70/30 | 1.8 | 3.9 | 8.5 | 2.9 | 2.4 | 1.5 | 1.7 | 2.5 | 3.3 | 29.3 |
| 90/10 | 4.9 | 8.8 | 15.5 | 8.6 | 8.7 | 4.7 | 6.9 | 3.8 | 9.0 | 70.7 |
| 95/5 | 8.0 | 15.2 | 20.0 | 12.0 | 18.8 | 9.9 | 15.5 | 6.0 | 13.9 | — |

Note:
Column A shows the weight percent ratio of the electrically conductive powder to the glass frit.

average particle diameter about 3 micrometers, in the weight percentages shown in column A of Table 2, respectively. Subsequently, each of the mixtures was fully mixed with a vehicle, which includes an organic polymer (e.g. acrylic resin) as a binder and organic solvents, at a weight percent of about 80:20, to produce a paste. The paste was printed, at a thickness of 20 micrometers, on an alumina substrate by means of 200 mesh screen, dried for 30 minutes at a temperature of 130° C. and baked for 10 minutes at a temperature of 1,000° C. in a nitrogen atmosphere. The resulting products were cooled. Then, their electrical-resistance values (ohma/square) were measured. The results are shown in the columns 3 to 9 of Table 2 corresponding to the composition 2 to 8 in Table 1, respectively.

Comparative Example 1

A glass frit, which was disclosed in the above-referenced Japanese Laid-Open Patent Publication No. 53-50496, was prepared. The ingredients and proportions of this glass frit is shown in Comparative Example column of Table 1. Since the glass frit did not contain any nuclear-forming agent, it could not be crystallized under the condition of about 1,000° C. temperature baking. Namely, this glass frit is amorphous glass.

The glass frit was fully mixed with molybdenum silicide, having an average particle diameter about 3 micrometers, in the weight percentages shown in column A of Table 2. Subsequently, the mixture was fully mixed with a vehicle, which includes an organic polymer (e.g. acrylic resin) as a binder and organic solvents, at a weight percent of about 80:20, to produce a paste. The paste was printed, at a thickness of 20 micrometers, on an alumina substrate by means of 200 mesh screen, dried for 30 minutes at a art, for the same amount of heat generation. As a consequence, the heater sintered from the heat-generating composition of this invention is very economical, whereby its application scope is broadened. In addition, the inventors have confirmed that a heater produced according to this invention has excellent resistance to damage or change in properties due to heat, thermal shock and humidity as shown in the following tests.

Heat-Cycle Test

In a heat-cycle test, the temperature was raised to 800° C. over a period of three minutes, then maintained constant for 2 minutes, and finally cooled rapidly. After one time of the heat-cycle test, no stripping of the heater from the substrate occurred. Further, there was only a very small change in the electrical-resistance value of the heater.

Thermal Shock Resistance Test

The heater on the substrate, as above, was heated to a temperature of 900° C., and then placed in water. No stripping of the heater from the substrate was observed. Adhesion of the heater to the substrate remained excellent.

EXAMPLE 2. Comparative Example 2

In the other example of this invention, several compounds were selected as raw materials and blended to obtain the following weight percent in the glass formed after melting and cooling: MgO: 1.9%, CaO: 3.3%, BaO: 31.4%, $B_2O_3$: 40.4%, $SiO_2$: 4.4%, $Al_2O_3$: 6.7%, and $TiO_2$: 11.9%. The blend was then melted at a temperature of 1,350° C. for about 60 minutes. It was then rapidly cooled to produce a glass flake. The glass flake was pulverized for 6 hours in a ball mill to produce a crystallizable glass frit. The average particle diameter was from about 2 to about 3 micrometers.

The crystallizable glass frit was fully mixed with molybdenum silicide having an average particle diameter of about 3 micrometers, and the metal oxide powders and/or metal powders as additives having an average particle diameter of from about 2 to about 3 micrometers. Numbers 8 to 63 in Table 3 are composition of this invention, while numbers 1 to 7 represent comparative compositions which are described below.

A mixture of the above elements was mixed with a vehicle, which includes a resin and organic solvents, at a weight ratio of about 80:20, to produce a paste. The paste was printed, at a thickness of about 20 micrometers on an alumina substrate using a 200 mesh screen, and dried for 15 minutes at a temperature of 120° C. Then the glass layer paste was obercoated on the heat-generating composition. Then the heat-generating composition and glass layer were simultaneously sintered for 10 minutes at a temperature of 1,050° C. in a nitrogen atmosphere. The resulting heater was then cooled.

The electrical-resistance value of the resulting heater was measured by a 4-terminal method. The results are shown in columns 8 to 63 of Table 3. Table 3 also shows the results of calculating the temperature coefficient of resistance (TCR:ppm/°C.) on the basis of the electrical-resistance value at 25° C. and 125° C., respectively, according to the following formura:

$$\frac{1}{125-25} \times \frac{(\text{Resistance at 125° C.} - \text{Resistance at 25° C.}) \times 10^6 \, (\text{ppm/°C.})}{\text{Resistance at 25° C.}}$$

To produce comparative example compositions identified in Table 3 as numbers 1 to 6, the procedure described above in an example of this invention was repeated to prepare a heater, except that the composition did not contain a metal oxide powder and/or a metal powder as an additive. Composition number 7 in Table 3 uses a metal oxide powder and a metal powder as additives, while it has a weight ratio of the molybdenum silicide to the glass frit being less than 50:50. The electrical-resistance value was measured and the temperature coefficient of resistance (TCR) was then calculated by the procedure described for the above example of this invention. The results are shown in columns 1 to 7 of Table 3.

In Table 3, in the column labeled "HEAT-RESISTANCE", the symbols used are defined as follows:

○: the heater exhibits good heat-resistance, which is less than 2% increase in the electrical-resistance value after turning the power source ON and OFF over 50,000 times at a temperature of

TABLE 3

| No. | MoSi$_2$ (wt %) | Glass Frit (wt %) | A (wt %) | B (wt %) | R (n/sq.) | TCR (ppm/°C.) | HEAT-RESISTANCE | SURFACE |
| --- | --- | --- | --- | --- | --- | --- | --- | --- |
| 1 | 45 | 55 | — | — | 3.6 | 1000 | ○ | X |
| 2 | 50 | 50 | — | — | 3.0 | 1200 | ○ | Δ |
| 3 | 60 | 40 | — | — | 2.7 | 1350 | ○ | ○ |
| 4 | 70 | 30 | — | — | 2.5 | 1500 | ○ | ○ |
| 5 | 75 | 25 | — | — | 2.4 | 1700 | ○ | ○ |
| 6 | 80 | 20 | — | — | 2.2 | 1950 | Δ | ○ |
| 7 | 45 | 55 | Cu 15.0 | Fe$_2$O$_3$ 4.0 | 1.6 | 600 | ○ | X |
| 8 | 50 | 50 | Cu 15.0 | Fe$_2$O$_3$ 4.0 | 0.37 | 820 | ○ | Δ |
| 9 | 55 | 45 | Cu 15.0 | Fe$_2$O$_3$ 4.0 | 0.30 | 900 | ○ | ○ |
| 10 | 60 | 40 | Cu 15.0 | Fe$_2$O$_3$ 4.0 | 0.18 | 1160 | ○ | ○ |
| 11 | 70 | 30 | Cu 15.0 | Fe$_2$O$_3$ 4.0 | 0.12 | 1400 | ○ | ○ |
| 12 | 75 | 25 | Cu 15.0 | Fe$_2$O$_3$ 4.0 | 0.10 | 1650 | ○ | ○ |
| 13 | 80 | 20 | Cu 15.0 | Fe$_2$O$_3$ 4.0 | 0.08 | 2380 | Δ | ○ |
| 14 | 70 | 30 | Cu 2.0 | Fe$_2$O$_3$ 2.0 | 1.1 | 600 | ○ | ○ |
| 15 | " | " | Cu 4.0 | Fe$_2$O$_3$ 4.0 | 0.66 | 650 | ○ | ○ |
| 16 | " | " | Cu 6.0 | Fe$_2$O$_3$ 4.0 | 0.48 | 900 | ○ | ○ |
| 17 | " | " | Cu 10.0 | Fe$_2$O$_3$ 4.0 | 0.19 | 1200 | ○ | ○ |
| 18 | " | " | Cu 10.0 | Fe$_2$O$_3$ 6.0 | 0.20 | 1000 | ○ | ○ |
| 19 | " | " | Cu 10.0 | Fe$_2$O$_3$ 8.0 | 0.30 | 700 | ○ | ○ |
| 20 | " | " | Cu 15.0 | MnO$_2$ 4.0 | 0.28 | 800 | ○ | ○ |
| 21 | " | " | Cu 15.0 | Bi$_2$O$_3$ 4.0 | 0.25 | 950 | ○ | ○ |
| 22 | " | " | Ni 15.0 | Fe$_2$O$_3$ 4.0 | 0.18 | 1200 | ○ | ○ |
| 23 | " | " | Ni 15.0 | MnO$_2$ 4.0 | 0.20 | 1300 | ○ | ○ |

TABLE 3-continued

| No. | MoSi$_2$ (wt %) | Glass Frit (wt %) | A (wt %) | B (wt %) | R (n/sq.) | TCR (ppm/°C.) | HEAT-RESISTANCE | SURFACE |
|---|---|---|---|---|---|---|---|---|
| 24 | " | " | Ni 15.0 | Bi$_2$O$_3$ 4.0 | 0.24 | 1000 | ○ | ○ |
| 25 | " | " | Ag 15.0 | Fe$_2$O$_3$ 4.0 | 0.47 | 750 | ○ | ○ |
| 26 | " | " | Ag 15.0 | MnO$_2$ 4.0 | 0.46 | 700 | ○ | ○ |
| 27 | " | " | Ag 15.0 | Bi$_2$O$_3$ 4.0 | 0.50 | 650 | ○ | ○ |
| 28 | " | " | Bi$_2$O$_3$ 2.6 | — | 1.5 | 1200 | ○ | ○ |
| 29 | " | " | Bi$_2$O$_3$ 5.0 | — | 1.7 | 980 | ○ | ○ |
| 30 | " | " | Bi$_2$O$_3$ 10.0 | — | 1.8 | 700 | ○ | ○ |
| 31 | " | " | Bi$_2$O$_3$ 20.0 | — | 2.3 | 550 | ○ | ○ |
| 32 | " | " | CuO 4.0 | — | 1.5 | 1100 | ○ | ○ |
| 33 | " | " | CuO 8.0 | — | 1.2 | 1200 | ○ | ○ |
| 34 | " | " | CuO 16.0 | — | 0.8 | 1400 | ○ | ○ |
| 35 | " | " | Cu$_2$O 4.0 | — | 1.3 | 1000 | ○ | ○ |
| 36 | " | " | Cu$_2$O 8.0 | — | 1.0 | 1200 | ○ | ○ |
| 37 | " | " | Cu$_2$O 16.0 | — | 0.7 | 1400 | ○ | ○ |
| 38 | " | " | NiO 4.0 | — | 1.5 | 1100 | ○ | ○ |
| 39 | " | " | NiO 8.0 | — | 1.3 | 1200 | ○ | ○ |
| 40 | " | " | NiO 16.0 | — | 0.7 | 1300 | ○ | ○ |
| 41 | " | " | Ag$_2$O 4.0 | — | 1.7 | 900 | ○ | ○ |
| 42 | " | " | Ag$_2$O 8.0 | — | 1.5 | 1000 | ○ | ○ |
| 43 | " | " | Ag$_2$O 16.0 | — | 1.2 | 1200 | ○ | ○ |
| 44 | " | " | MnO$_2$ 1.0 | — | 1.9 | 900 | ○ | ○ |
| 45 | " | " | MnO$_2$ 4.0 | — | 2.1 | 650 | ○ | ○ |
| 46 | " | " | Fe$_2$O$_3$ 1.0 | — | 2.0 | 850 | ○ | ○ |
| 47 | " | " | Fe$_2$O$_3$ 4.0 | — | 2.2 | 470 | ○ | ○ |
| 48 | " | " | Bi$_2$O$_3$ 10.0 | MnO$_2$ 1.0 | 1.5 | 800 | ○ | ○ |
| 49 | " | " | Cu$_2$O 10.0 | MnO$_2$ 1.0 | 0.9 | 950 | ○ | ○ |
| 50 | " | " | NiO 10.0 | MnO$_2$ 1.0 | 1.0 | 900 | ○ | ○ |
| 51 | " | " | Bi$_2$O$_3$ 10.0 | Fe$_2$O$_3$ 1.0 | 1.6 | 700 | ○ | ○ |
| 52 | " | " | Cu$_2$O 10.0 | Fe$_2$O$_3$ 1.0 | 0.9 | 900 | ○ | ○ |
| 53 | " | " | NiO 10.0 | Fe$_2$O$_3$ 1.0 | 0.9 | 900 | ○ | ○ |
| 54 | " | " | Cu 1.0 | — | 2.0 | 1200 | ○ | ○ |
| 55 | " | " | Cu 4.0 | — | 0.9 | 1300 | ○ | ○ |
| 56 | " | " | Cu 20.0 | — | 0.8 | 1400 | ○ | ○ |
| 57 | " | " | Ni 1.0 | — | 1.8 | 1200 | ○ | ○ |
| 58 | " | " | Ni 4.0 | — | 0.7 | 1400 | ○ | ○ |
| 59 | " | " | Ni 20.0 | — | 0.8 | 1400 | ○ | ○ |
| 60 | " | " | Ag 1.0 | — | 2.2 | 1100 | ○ | ○ |
| 61 | " | " | Ag | — | 1.4 | 1200 | ○ | ○ |

TABLE 3-continued

| No. | MoSi$_2$ (wt %) | Glass Frit (wt %) | A (wt %) | B (wt %) | R (n/sq.) | TCR (ppm/°C.) | HEAT-RESISTANCE | SURFACE |
|---|---|---|---|---|---|---|---|---|
| 62 | " | " | 4.0 Ag 20.0 | — | 1.3 | 1300 | ◯ | ◯ |
| 63 | " | " | Cu 4.0 | Ni 4.0 | 0.6 | 1200 | ◯ | ◯ |

Note:
The weight percent of A or B is the ratio to the total weight of MoSi$_2$ + Glass Frit.

from 20° to 500° C. The increase in electrical-resistance value is caused by micro-cracks which form in the heater during repetitive increases and decreases in temperature.

Δ: the heater does not exhibit good heat-resistance, which is more than 2% increase in the electrical-resistance value after turning the power source ON and OFF less than about 10,000 times at a temperature of from 20° to 500° C.

In Table 3, in the column labeled "SURFACE", the symbols used are defined as follows:
◯: surface is smooth
Δ: surface is between smooth and rough
X : surface is rough In Table 3, "A" and "S" refer to types of additives, "R" refers to an electrical-resistance value, and "TCR" refers to a temperature coefficient of resistance value.

Further, according to the same way as mentioned above, glass frit having compositions 1 to 5 in Table 4 were produced. Namely, the weight percent of TiO$_2$ was changed to the constant ratio of other components of glass composition, respectively.

Thereafter, the glass frit was fully mixed with molybdenum silicide and additive at the weight ratio in Table 4, and the heat-generating composition was produced, respectively.

Then, said heat-generating composition was sintered by means of same way as above-mentioned, and the heater was produced, respectively.

The electlical-resistance value of the resulting heater was mesured by a 4-terminal method, and was represented in Table 4 and FIG. 3.

TABLE 4

|  | 1 | 2 | 3 | 4 | 5 |
|---|---|---|---|---|---|
| Glass Composition (wt %) |  |  |  |  |  |
| MgO | 2.2 | 2.1 | 2.0 | 1.9 | 1.8 |
| CaO | 3.7 | 3.8 | 3.4 | 3.3 | 3.1 |
| BaO | 35.6 | 33.8 | 32.0 | 31.4 | 29.6 |
| B$_2$O$_3$ | 45.9 | 43.5 | 41.3 | 40.4 | 38.1 |
| SiO$_2$ | 5.0 | 4.8 | 4.5 | 4.4 | 4.1 |
| Al$_2$O$_3$ | 7.6 | 7.2 | 6.8 | 6.7 | 6.3 |
| TiO$_2$ | 0.0 | 5.0 | 10.0 | 11.9 | 17.0 |
| Heat-Generating Composition |  |  |  |  |  |
| Glass Frit (wt %) |  |  | 35 |  |  |
| MoSi$_2$ (wt %) |  |  | 65 |  |  |

TABLE 4-continued

|  | 1 | 2 | 3 | 4 | 5 |
|---|---|---|---|---|---|
| Additive (wt %) |  |  |  |  |  |
| Ni |  |  | 15.0 |  |  |
| MnO$_2$ |  |  | 4.0 |  |  |
| R (Ω/sq.) | 1.00 | 0.33 | 0.25 | 0.20 | 0.13 |

Note:
The weight percent of Additive is the ratio to the total weight of Glass Frit and MoSi$_2$.

EXAMPLE 3. Comparative Example 3

In the other example of this invention, the crystallizable glass frit having the same ingredients as in Example 2, was produced by the same treatment as in Example 2.

The crystallizable glass frit was fully mixed with molybdenum silicide having an average particle diameter of about 3 micrometers, nickel silicide having an average particle diameter of about 3 micrometers, and nickel powder as an additive having an average particle diameter of about 3 micrometers. Numbers 3 to 8, 11 to 13, and 16 to 19 in Table 5 are compositions of this invention, while numbers 1, 2, 9, 10, 14, 15, and 20 represent comparative compositions.

A mixture of the above elements was mixed with a vehicle, at a weight ratio of about 80:20, to produce a paste. The paste was printed, and dried by the same way as in Example 2. Then the glass layer paste was overcoated on the heat-generating composition. Then the heat-generating composition and glass layer were simultaneously sintered for 10 minutes at a temperature of 950° C. in a nitrogen atmosphere. 1,050° C. in a nitrogen atmosphere, and 950° C. in air, respectively. The resulting heater was then cooled.

The electrical-resistance value of the resulting heater was measured by a 4-terminal method. The results are shown in Table 5.

In Table 5, in the column labeled "HEAT-RESISTANCE", the symbols used are defined as follows:

◯: the heater exhibits good heat-resistance, which is less than 0.5% increase or decrease in the electrical-resistance value after turning the power source ON and OFF over 50,000 times at a temperature of from 20° to 500° C.

Δ: the heater does not exhibit good heat-resistance, which is

TABLE 5

| | Heat-Generating Composition | | | | R (Ω/sq.) | | | |
|---|---|---|---|---|---|---|---|---|
| | | | Glass | | in N₂ | | in Air | HEAT- |
| | MoSi₂ | NiSi₂ | Frit | Ni | | | | |
| No. | (Wt %) | (Wt %) | (Wt %) | (Wt %) | 950° C. | 1050° C. | 950° C. | RESISTANCE |
| 1 | 68.2 | 0.0 | 31.8 | 2.0 | 2.10 | 0.28 | >10⁹ | ◯ |
| 2 | 55.2 | 2.0 | " | " | 0.90 | 0.18 | 100 | ◯ |
| 3 | 63.1 | 5.1 | " | " | 0.30 | 0.08 | 0.98 | ◯ |
| 4 | 59.7 | 8.5 | " | " | 0.24 | 0.06 | 0.86 | ◯ |
| 5 | 58.9 | 9.3 | " | " | 0.21 | 0.05 | 0.67 | ◯ |
| 6 | 54.8 | 13.4 | " | " | 0.29 | 0.07 | 0.69 | ◯ |
| 7 | 52.2 | 16.0 | " | " | 0.35 | 0.12 | 0.58 | ◯ |
| 8 | 47.8 | 20.4 | " | " | 0.97 | 0.34 | 1.00 | ◯ |
| 9 | 43.9 | 24.3 | " | " | 1.58 | 0.54 | 2.40 | ◯ |
| 10 | 66.2 | 13.4 | 20.4 | 2.0 | 1.24 | 0.30 | 3.50 | △ |
| 11 | 61.1 | " | 25.5 | " | 0.59 | 0.18 | 0.93 | ◯ |
| 12 | 54.8 | " | 31.8 | " | 0.29 | 0.07 | 0.59 | ◯ |
| 13 | 50.9 | " | 35.7 | " | 0.40 | 0.12 | 0.80 | ◯ |
| 14 | 45.8 | " | 40.8 | " | 1.01 | 0.32 | 1.50 | ◯ |
| 15 | 55.0 | 16.4 | 28.6 | 0.0 | 1.20 | 0.22 | 1.40 | ◯ |
| 16 | 55.1 | 16.3 | " | 0.1 | 0.80 | 0.15 | 0.81 | ◯ |
| 17 | 55.5 | 15.6 | 28.9 | 1.0 | 0.38 | 0.09 | 0.73 | ◯ |
| 18 | 57.9 | 12.0 | 30.1 | 5.3 | 0.35 | 0.08 | 0.94 | ◯ |
| 19 | 61.1 | 7.1 | 31.8 | 11.1 | 0.45 | 0.19 | 1.00 | ◯ |
| 20 | 62.5 | 5.0 | 32.5 | 13.8 | 0.92 | 0.34 | 2.50 | △ |

Note:
The weight percent of Ni is the ratio to the total weight of MoSi₂, NiSi₂, and Glass Frit.

more than 0.5% increase or decrease in the electrical-resistance value after turning the power source ON and OFF over 50,000 times at a temperature of from 20° to 500° C.

In Table 5, "R" refers to an electrical-resistance value.

Having described preferred embodiment of this invention with reference to the accompanying drawings, it is to be understood that this invention is not limited to the precise embodiments and that various changes and modifications may be affected therein by one skilled in the art without departing from the scope or spirit of this invention which is limited only by the appended claims.

What is claimed is:

1. A heat-generating composition comprising:

an electrically conductive powder;

and a crystallizable glass frit wherein the weight ratio of said electrically conductive powder to said crystallizable glass frit is from about 30:70 to about 95:5; and said crystallizable glass frit, which is essentially crystallized during sintering, has the following ingredients:

| | |
|---|---|
| $M^{II}O$ | = about 25 to about 45 weight percent |
| $B_2O_3$ | = about 20 to about 60 weight percent |
| $M^{III}_2O_3$ | = about 1 to about 5 weight percent |
| $M^{I}_2O$ | = about 0 to about 5 weight percent |
| $SiO_2$ | = about 2 to about 10 weight percent |
| $Al_2O_3$ | = about 2 to about 10 weight percent |
| $Bi_2O_3$ | = about 0 to about 10 weight percent |
| Nuclear-forming agent | = about 0 to about 20 weight percent |

$M^I$ is one or more alkali metals selected from the group consisting of Li, Na, K, Rb, and Cs;

$M^{II}$ is one or more alkaline-earth metals selected from the group consisting of Mg, Ca, Sr, and Ba;

$M^{III}$ is one or more elements selected from the group consisting of scandium, yttrium, and lanthanide;

a lanthanide is an element from the periodic table of elements in the range of from lanthanum (La) to lutetium (Lu);

the nuclear-forming agent is one or more agents selected from the group consisting of $TiO_2$, $ZrO_2$, $P_2O_5$, $SnO_2$, $ZnO$, $MoO_3$, $Ta_2O_5$, $Nb_2O_5$, and $As_2O_3$.

2. The heat-generating composition according to claim 1, in which said electrically conductive powder includes at least one selected from the group consisting of molybdenum silicide, titanium silicide, tungsten silicide, nickel silicide, manganese silicide, tantalum silicide, silicon carbide, molybdenum carbide, and molybdenum boride.

3. The heat-generating composition according to claim 1, in which the weight percent of $Bi_2O_3$ in said crystallizable glass frit is from about 1 to about 10.

4. The heat-generating composition according to claim 3, wherein said electrically conductive powder includes at least one selected from the group consisting of molybdenum silicide, titanium silicide, tungsten silicide, nickel silicide, manganese silicide, tantalum silicide, silicon carbide, molybdenum carbide, and molybdenum boride.

5. A heat-generating composition comprising:

an electrically conductive powder;

and a crystallizable glass frit wherein the weight ratio of said electrically conductive powder to said crystallizable glass frit is from about 30:70 to about 95:5; and said crystallizable glass frit, which is essentially crystallized during sintering, has the following ingredients:

| | |
|---|---|
| $M^{II}O$ = | about 25 to about 45 weight percent |
| $B_2O_3$ = | about 20 to about 60 weight percent |
| $M^{III}_2O_3$ = | about 0 to about 5 weight percent |
| $M^{I}_2O$ = | about 0 to about 5 weight percent |
| $SiO_2$ = | about 2 to about 10 weight percent |
| $Al_2O_3$ = | about 2 to about 10 weight percent |
| $Bi_2O_3$ = | about 1 to about 10 weight percent |
| Nuclear-forming agent = | about 0 to about 20 weight percent |

$M^I$ is one or more alkali metals selected from the group consisting of Li, Na, K, Rb, and Cs;

$M^{II}$ is one or more alkaline-earth metals selected from the group consisting of Mg, Ca, Sr, and Ba;

$M^{III}$ is one or more elements selected from the group consisting of scandium, yttrium, and lanthanide;

a lanthanide is an element from the periodic table of elements in the range of from lanthanum (La) to lutetium (Lu);

the nuclear-forming agent is one or more agents selected from the group consisting of $TiO_2$, $ZrO_2$, $P_2O_5$, $SnO_2$, ZnO, $MoO_3$, $Ta_2O_5$, $Nb_2O_5$, and $As_2O_3$.

6. The heat-generating composition according to claim 5, in which said electrically conductive powder includes at least one selected from the group consisting of molybdenum silicide, titanium silicide, tungsten silicide, nickel silicide, manganese silicide, tantalum silicide, silicon carbide, molybdenum carbide, and molybdenum boride.

7. A heat-generating composition comprising:

a molybdenum silicide as an electrically conductive powder;

a nickel silicide as an electrically conductive powder;

a glass frit;

a weight ratio of said nickel silicide to a total weight of said molybdenum silicide, said nickel silicide, and said glass frit is in a range of from about 5:100 to about 22:100;

a weight ratio of the sum of said electrically conductive powder to said glass frit is in a range of from about 60:40 to about 75:25;

a nickel powder as an additive;

a weight ratio of said nickel powder to a total weight of said molybdenum silicide, said nickel silicide, and said glass frit is in a range of from about 0.1:100 to about 12:100.

8. The heat-generating composition according to claim 7, wherein the weight ratio of the nickel silicide to the total weight of the molybdenum silicide, the nickel silicide, and the glass frit is in a range of from about 8:100 to about 18:100.

9. The heat-generating composition according to claim 7, wherein the weight ratio of the sum of the electrically conductive powder to the glass frit is in a range of from about 64:36 to about 72:28.

10. The heat-generating composition according to claim 7, wherein the weight ratio of the nickel powder to the total weight of the molybdenum silicide, the nickel silicide, and the glass frit is in a range of from about 0.5:100 to about 6:100.

11. The heat-generating composition according to claim 7, wherein the weight ratio of the nickel silicide to the total weight of the molybdenum silicide, the nickel silicide, and the glass frit is in a range of from about 8:100 to about 18:100;

the weight ratio of the sum of the electrically conductive powder to the glass frit is in a range of from about 64:36 to about 72:28;

the weight ratio of the nickel powder to the total weight of the molybdenum silicide, the nickel silicide, and the glass frit is in a range of from about 0.5:100 to about 6:100.

12. The heat-generating composition according to claim 7, wherein the glass frit has the following ingredients:

| | |
|---|---|
| $M^{II}O$ = | about 5 to about 50 weight percent |
| $B_2O_3$ = | about 20 to about 80 weight percent |
| $M^{III}_2O_3$ = | about 0 to about 10 weight percent |
| $M^I_2O$ = | about 0 to about 35 weight percent |
| $SiO_2$ = | about 0 to about 40 weight percent |
| $Al_2O_3$ = | about 0 to about 40 weight percent |
| $Bi_2O_3$ = | about 0 to about 10 weight percent |
| Nuclear-forming agent = | about 0 to about 20 weight percent |

$M^I$ is one or more alkali metals selected from the group consisting of Li, Na, K, Rb, and Cs;

$M^{II}$ is one or more alkaline-earth metals selected from the group consisting of Mg, Ca, Sr, and Ba;

$M^{III}$ is one or more elements selected from the group consisting of scandium, yttrium, and lanthanide; a lanthanide is a generalized element from the periodic table of elements in the range of from lanthanum (La) to lutetium (Lu);

the nuclear-forming agent is one or more agents selected from the group consisting of $TiO_2$, $ZrO_2$, $P_2O_5$, $SnO_2$, ZnO, $MoO_3$, $Ta_2O_5$, $Nb_2O_5$, and $As_2O_3$.

13. The heat-generating composition according to claim 7, wherein the glass frit has the following ingredients:

| | |
|---|---|
| $M^{II}O$ = | about 5 to about 50 weight percent |
| $B_2O_3$ = | about 20 to about 80 weight percent |
| $M^{III}_2O_3$ = | about 0 to about 10 weight percent |
| $M^I_2O$ = | about 0 to about 5 weight percent |
| $SiO_2$ = | about 0 to about 40 weight percent |
| $Al_2O_3$ = | about 0 to about 40 weight percent |
| $Bi_2O_3$ = | about 0 to about 10 weight percent |
| $TiO_2$ = | about 5 to about 20 weight percent |
| Nuclear-forming agent = | about 0 to about 20 weight percent |

$M^I$ is one or more alkali metals selected from the group consisting of Li, Na, K, Rb, and Cs;

$M^{II}$ is one or more alkaline-earth metals selected from the group consisting of Mg, Ca, Sr, and Ba;

$M^{III}$ is one or more elements selected from the group consisting of scandium, yttrium, and lanthanide; a lanthanide is a generalized element from the periodic table of elements in the range of from lanthanum (La) to lutetium (Lu);

the nuclear-forming agent is one or more agents selected from the group consisting of $ZrO_2$, $P_2O_5$, $SnO_2$, ZnO, $MoO_3$, $Ta_2O_5$, $Nb_2O_5$, and $As_2O_3$.

14. The heat-generating composition according to claim 7, wherein the glass frit has the following ingredients:

| | |
|---|---|
| $M^{II}O$ = | about 25 to about 45 weight percent |
| $B_2O_3$ = | about 20 to about 60 weight percent |
| $M^{III}_2O_3$ = | about 0 to about 5 weight percent |
| $M^I_2O$ = | about 0 to about 5 weight percent |
| $SiO_2$ = | about 2 to about 10 weight percent |
| $Al_2O_3$ = | about 2 to about 10 weight percent |

-continued

| | |
|---|---|
| $Bi_2O_3$ = | about 0 to about 10 weight percent |
| $TiO_2$ = | about 8 to about 17 weight percent |
| Nuclear-forming agent = | about 0 to about 20 weight percent |

$M^I$ is one or more alkali metals selected from the group consisting of Li, Na, K, Rb, and Cs;

$M^{II}$ is one or more alkaline-earth metals selected from the group consisting of Mg, Ca, Sr, and Ba;

$M^{III}$ is one or more elements selected from the group consisting of scandium, yttrium, and lanthanide; a lanthanide is a generalized element from the periodic table of elements in the range of from lanthanum (La) to lutetium (Lu);

the nuclear-forming agent is one or more agents selected from the group consisting of $ZrO_2$, $P_2O_5$, $SnO_2$, ZnO, $MoO_3$, $Ta_2O_5$, $Nb_2O_5$, and $As_2O_3$.

\* \* \* \* \*

UNITED STATES PATENT AND TRADEMARK OFFICE
CERTIFICATE OF CORRECTION

PATENT NO. : 5,470,506

DATED : November 28, 1995

INVENTOR(S) : Yoshinori TANIGAMI, Takahiro TABATA, Hidekazu HASHIMA and Akio KONISHI It is certified that error appears in the above-identified patent and that said Letters Patent is hereby corrected as shown below:

Column 26, line 9, in claim 12, change "35" to --5--.

Signed and Sealed this

Thirtieth Day of April, 1996

Attest:

BRUCE LEHMAN

*Attesting Officer*     *Commissioner of Patents and Trademarks*